Figures 1, 2:
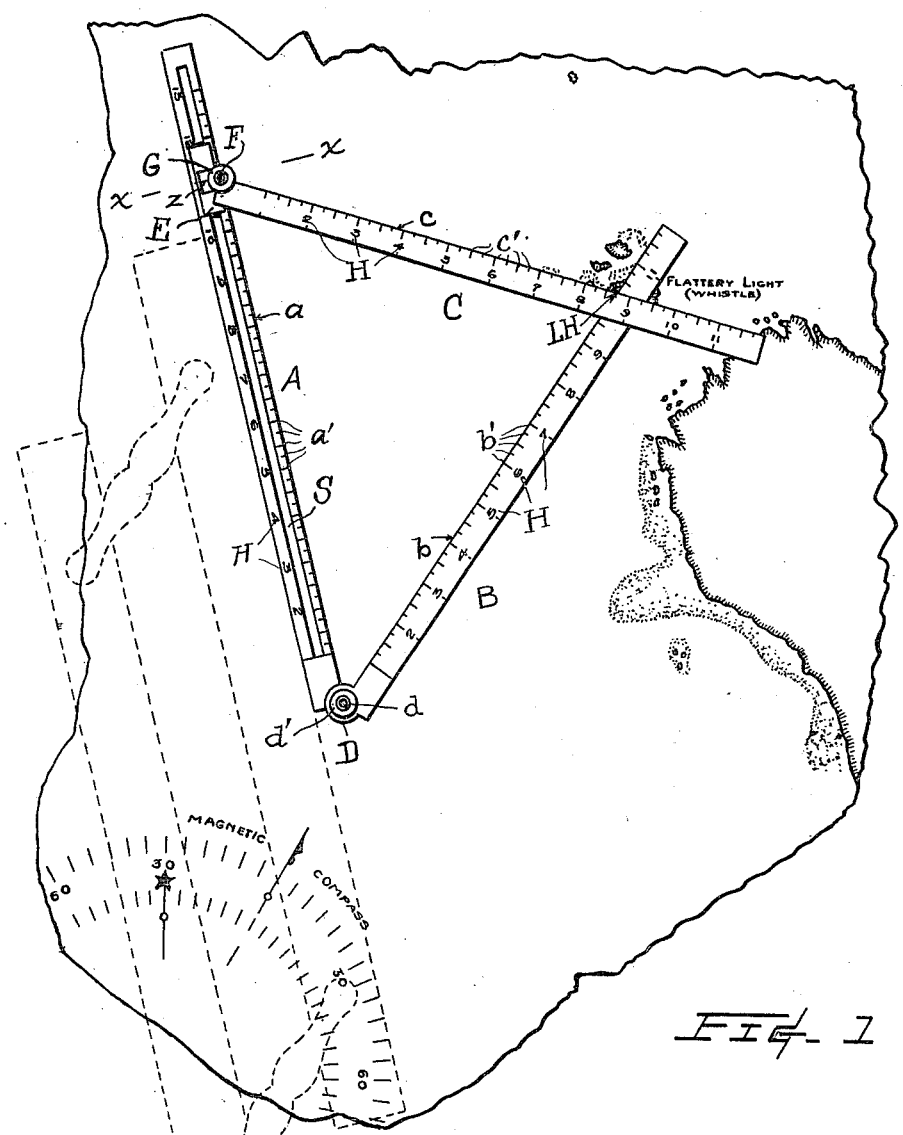

W. J. SMITH.
MEANS FOR LOCATING SHIPS' POSITIONS.
APPLICATION FILED NOV. 22, 1907.

964,456.

Patented July 12, 1910.

WITNESSES:
Horace Barnes
Paul Barnes

INVENTOR.
W. J. Smith
BY
Pierre Barnes
ATTORNEY.

UNITED STATES PATENT OFFICE.

WILLIAM J. SMITH, OF SEATTLE, WASHINGTON.

MEANS FOR LOCATING SHIPS' POSITIONS.

964,456.  Specification of Letters Patent.  Patented July 12, 1910.

Application filed November 22, 1907. Serial No. 403,365.

*To all whom it may concern:*

Be it known that I, WILLIAM J. SMITH, a citizen of the United States, residing at Seattle, in the county of King and State of Washington, have invented certain new and useful Improvements in Means for Locating Ships' Positions, of which the following is a specification, reference being had therein to the accompanying drawings.

This invention relates to the navigation of marine vessels and, more especially, to means whereby the position of a vessel may be reliably ascertained in foggy weather and with respect to a suitably equipped signal station upon a sea coast.

According to well known laws, the pulsations by wireless telegraph are transmitted from one instrument to another at a speed of approximately 186,337 miles per second of time, or at such an extremely high velocity as to be practically regarded for the purposes of this invention as influencing a receiving instrument coincidently with the operation of the despatching one; while sound waves, with an atmospheric temperature of 60 degrees, Fahrenheit, travel at the rate of but 1,123 feet per second. With these facts in mind it is evident that distances may be estimated from a signal station which coincidently employs both of such expedients of announcement, that is, wireless telegraph apparatus, and sound waves created, for example, by a fog-horn, and by noting the time with which communication is had by a wireless receiving equipment upon a vessel and observing the interval which elapses therefrom to the time in which the sounds of the horn reach the vessel, it is obvious that the distance can be computed at which the vessel is from the signal station, to-wit: Multiplying the interval of time in seconds by 1,123 will give an equivalent distance in feet and which is reducible to miles (nautical) by dividing the product by 6,080.

Now upon a chart of the coast describe an arc of a circle about the signal station with a radius to correspond with the scale of the chart, of the distance so obtained. After pursuing its course, to alter the position of the vessel's bearing with respect to the signal station, its distance therefrom is then again ascertained by the aforedescribed method and a corresponding arc of a circle is described from the signal station. The distance traveled by the vessel in the interim, taken from the ship's log, and transferred by a pair of dividers set to proper scale, to the edge of one of the members of a parallel rule and whose other member is laid upon the course or direction in which the vessel has been traveling in such interval of time, and then by moving the divider and the member of the rule against which the divider is resting to and fro upon the chart until the points of the divider legs are respectively positioned within the two previously made arcs, which points thereupon designate the locations of the vessel at the time of each complete observation, and from which the bearing of the signal station or other features shown on the chart are obtainable.

The object of the present invention is the provision of devices whereby the foregoing results are attainable in a most convenient and rapid manner and with a nice degree of accuracy.

The invention consists of a three-sided instrument which is capable of having the sides adjusted in various angles with respect to each other and are severally graduated, thus affording means for not only designating direction but likewise distances to a scale appropriate to the chart with which the instrument is to be used, as will be hereinafter described and finally set forth in the appended claims.

In the drawings, Figure 1 is a plan view of an instrument embodying my invention represented upon a portion of a chart depicting a sea-coast. Fig. 2 is a cross sectional view taken through $x$—$x$ of Fig. 1.

The reference letters A, B, and C respectively designate the three side members of the instrument. An end of the member A is hinged to an end of the member B by a suitable pivotal connection, such as a rule-joint D having a pivot $d$ and wherein the axis is disposed to be in the intersection of the planes of the edges $a$ and $b$ of the respective parts. A thumb-nut $d'$ may advantageously be used upon a protruding end of this pivot. The member C is pivotally connected with the member A and in such manner that its axis of movement will be in the plane of the member edges $a$ and $c$ and be furthermore adjustable longitudinally of A. This connection is preferably made by providing a longitudinal slot S within the part A and slidably seated therein is a block E carrying a stud F to which the part C is pivoted. The block E, as illustrated, is of an inverted T-shape in cross section, see Fig. 2, and its branches $e'$ are seated within rabbets $s$ upon each side of said slot. The stud is screw threaded to accommodate a nut G which can be screwed down upon the part C for securing the same against any change in its angular adjustment with respect to the part A. The stud F is offset with respect to the block E so that its axis will be located in alinement with the lateral edge $c$ of the part C.

Each of the three members of the instrument is provided along the referred to edges, namely, $a$, $b$, and $c$ with graduate marks, as $a'$, $b'$ and $c'$, which are arranged to conform to a common scale, and desirably, though not necessarily so, to the scale of the mariners' charts with which the instrument is intended to be used. The scale markings of the various members being disposed to have their initial points coincide with the axes of their several pivots and employing these points as zeros and be notated therefrom by suitable denominating characters, such as H, designating miles, for example.

To facilitate the use of the instrument the pivots $d$ and F are desirably made with centrally disposed apertures through which a pencil point may be brought into contact with a chart for indicating the respective positions thereupon.

The operation of the instrument may be explained with reference to Fig. 1, where a fragment of a chart is reproduced showing a portion of a sea-coast (Cape Flattery) which is extremely disastrous to mariners from the prevalence of fogs, and in such weather navigators are warned of their proximity to danger by the intermittent blowing of a fog horn at the light-house, denoted by LH. The light-house is also equipped with wireless telegraph instruments. Assuming that signals are simultaneously delivered through telegraphic and sound producing apparatus from LH, see Fig. 1, and which signals are similarly repeated after the lapse of a certain length of time. From such data and in the before explained manner, the distances a vessel is from the despatching station is determined. For instance, the first observations establish the distance at the time the sound waves were received to be ten and one-fourth miles; and for the second, eight and three-fourths miles; while the distance the vessel has traveled has been found by the log to be eleven and one-third miles. The instrument is now adjusted by arranging the members A, B and C thereof so that the index mark $z$ upon the block E will register with the graduate mark denoting eleven and one-third miles; and having the members B and C cross each other so that the markings which respectively denote ten and one-fourth and eight and three-fourths miles will coincide. The instrument is then rendered rigid by tightening their pivotal connections with the thumb-screws $d'$ and F. With the instrument thus set and with the intersection of the two members placed upon the point LH. and the member A directed to be in line with the course of the vessel as found with parallel rules; it is obvious that the axis of pivot F designates the location in which the vessel was at the second observation and the location of the first observation, moreover, will be in the axis of the pivot $d$. These results can be readily verified by a simple calculation of trigonometry.

The value of the invention will be apparent from the foregoing.

Having described my invention, what I claim, is:

1. An instrument for determining from a geographical chart the position of a vessel with respect to a station indicated upon the chart, said instrument embodying three members, two of such members being connected by a hinge-joint, one of said members being provided with a slot having rabbets along the bottom of its lateral edges, a block of an inverted T-shape in cross section, a stud extending upwardly from the block to afford a pivotal connection for the other of said members, and means for securing the last referred to member at various angular adjustments with respect to the member which is provided with the slot, said hinge-joint and stud being each provided with a perforation adapted to receive a pointing instrument.

2. A device of the class described comprising two members connected by a hinge-joint, one of said members being provided with a slot, a block slidably positioned within said slot, another member, a stud extending from said block affording a pivotal connection for said latter member, said hinge-joint and stud being each provided with a perforation adapted to receive a pointing instrument.

In testimony whereof I affix my signature in presence of two witnesses.

WILLIAM J. SMITH.

Witnesses:
HORACE BARNES,
ROBERT B. GILLIES.